United States Patent
Guey

(10) Patent No.: US 7,733,989 B2
(45) Date of Patent: Jun. 8, 2010

(54) METHOD AND SYSTEM OF CHANNEL ESTIMATION

(75) Inventor: Jiann-Ching Guey, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1044 days.

(21) Appl. No.: 11/375,244

(22) Filed: Mar. 15, 2006

(65) Prior Publication Data
US 2007/0127602 A1 Jun. 7, 2007

Related U.S. Application Data

(60) Provisional application No. 60/743,014, filed on Dec. 5, 2005.

(51) Int. Cl.
*H04L 27/08* (2006.01)
(52) U.S. Cl. .............. 375/340; 375/260; 375/343; 375/152; 375/150; 375/143
(58) Field of Classification Search ............... 375/340, 375/316, 262, 341, 269, 279, 362, 355, 308, 375/334, 141, 233–236, 136, 142, 143, 150, 375/152, 260, 343, 349, 347; 708/5, 8, 21, 708/404; 455/143, 152.1, 161.2, 168.1, 186.1, 455/199.1, 231; 370/441, 471, 432
See application file for complete search history.

(56) References Cited

U.S. PATENT DOCUMENTS 7,463,691 B2* 12/2008 Tao et al. .............. 375/260
7,471,932 B2* 12/2008 Wu et al. .............. 455/91
2004/0125863 A1* 7/2004 Ghosh .............. 375/147
2005/0141626 A1 6/2005 Lee et al.

FOREIGN PATENT DOCUMENTS

GB 2 247 812 A 11/1992

OTHER PUBLICATIONS

Meng-Han Hsieh et al. "channel estimation for OFDM systems based on comb-type pilot arrangement in frequency selective fading channels", Feb. 1998, IEEE transactions on consumer electronics, vol. 44 issue 1, pp. 217-225.*
Edfors et al., *Analysis of DFT-Based Channel Estimators for OFDM*, Wireless Personal Communications, 12, pp. 55-70, 2000.
Yang et al., *Analysis of Low-Complexity Windowed DFT-Based MMSE Channel Estimator for OFDM Systems*, IEEE Transactions on Communications, vol. 49, No. 11, Nov. 2001, pp. 1977-1987.

(Continued)

*Primary Examiner*—David C Payne
*Assistant Examiner*—Rahel Guarino
(74) *Attorney, Agent, or Firm*—Nixon & Vanderhye P.C.

(57) ABSTRACT

Channel estimation is performed using side information. A signal transmitted over a radio channel includes side information corresponding to a first predetermined signal and a second predetermined signal. The first predetermined signal is different from the second predetermined signal. An estimate of the radio channel is determined using both the first predetermined signal and the second predetermined signal. Using multiple sources of side information improves the accuracy and the efficiency of the channel estimation. One example application is Orthogonal Frequency Division Multiplexing based communications systems.

23 Claims, 4 Drawing Sheets

OTHER PUBLICATIONS

Meng-Han Hsieh et al., "Channel Estimation for OFDM systems based on comb-type pilot arrangement in frequency selective fading channels", Feb. 1, 1998 IEEE Transactions on Consumer Electronics, vol. 44, Issue 1, pp. 217-225.

Andersson, T. W., An Introduction to Multivariate Statistical Analysis, Third Edition, Wiley, 2003; see pp. 33-34.

Wei Wu et al. "Optimal Channel Estimation for Capacity Maximization in OFDM Systems".

Ove Edfors et al. "OFDM Channel Estimation by Singular Value Decomposition"; In IEEE Transactions on Communications, vol. 46 No. 7, pp. 931-939, Jul. 1998.

Sinem Coleri et al. "Channel Estimation Techniques Based on Pilot Arrangement in OFDM Systems"; IEEE Transactions on Broadcasting, vol. 48, No. 3, Sep. 2002.

Rohit Negi and John Cioffi; "Pilot Tone Selection for Channel Estimation in a Mobile OFDM System"; IEEE Transactions on Consumer Electronics, vol. 44, No. 3, Aug. 1998.

Wei Wu et al. Wireless Communication Project (EE381K-11) Technical Report Optimal Channel Estimation for Capacity Maximization in OFDM Systems; pp. 1-24; May 6, 2003.

International Preliminary Report on Patentability for International Application No. PCT/SE2006/050480 dated May 9, 2008.

\* cited by examiner

METHOD AND SYSTEM OF CHANNEL ESTIMATION

RELATED CASES

Priority is claimed from U.S. provisional patent application 60/743,014 filed on Dec. 5, 2005, the contents of which are incorporated herein by reference.

TECHNICAL FIELD

The technical field is communications and channel estimation. More particularly, the technical field relates to Orthogonal Frequency Division Multiplexing (OFDM) and channel frequency response estimation.

BACKGROUND

In digital communications, channel estimation is needed to compensate for disturbances ubiquitous on a radio channel. Channel estimation and compensation are needed to achieve high data rates. Pilot tones or one or more sub-carriers may be transmitted when transmitting modulated information signals. Pilot tones may be used for channel equalization or transmission power control. Known symbols may also be inserted in a sequence of time-sequential data symbols.

OFDM is used in a variety of communications systems such as digital television, digital audio broadcasting, or digital radio, wireless LAN and various wireless communication systems, e.g. IEEE 802.11 (a and g), IEEE 802.16 (d and e) and CDMA2000.

A research proposal titled, *Optimal Channel Estimation for Capacity Maximization in OFDM Systems*, by Wu et al, Mar. 26, 2003, University of Texas Austin, USA, describes channel estimation techniques in designing OFDM systems. A theoretical tool for analyzing and comparing two different estimation techniques is proposed. The intent is to compare a frequency domain pilot tone method with time domain training sequence methods. From the optimization model, various parameters of the channel estimation can be tuned to maximize system capacity.

In the research proposal, the two channel estimation techniques for OFDM channel estimation are referred to as frequency domain pilot interpolation, FDPI, and time domain training sequence, TDTS. With FDPI, pilot tones are transmitted. With TDTS, a known pseudo-noise (PN) sequence is inserted at the beginning of a symbol in the time domain. The cross correlation between the received PN sequence and the known PN sequence can be used to estimate the channel response at the receiver. The proposal intends to develop analytical models and simulation tools to optimize pilot arrangement patterns or training sequence parameters to achieve maximum capacity.

FIG. 1 illustrates pilot arrangements discussed in the research proposal. There are two basic types of pilot tone arrangements: a comb-type pilot arrangement <<Comb-type>> and a block-type pilot arrangement <<Block-type>>. For the comb-type pilot arrangement, example pilot tones <<p1>>, <<p2>> are transmitted. Channel gain/attenuation at the pilot frequencies <<p1>>, <<p2>> is measured, and the channel gain/attenuation at intermediate frequencies is obtained by interpolation. For the block-type pilot arrangement, all sub-carriers are used as pilot tones at regular intervals. In the figure, two time-instances or time-intervals are illustrated <<t1>>, <<t2>>.

An article titled, *Pilot Tone Selection for Channel Estimation in a Mobile OFDM System*, by Negi et al., IEEE Trans. on Consumer Electronics, Vol. 44, No. 3, August 1998, addresses the issue of selecting pilot tones for channel estimation. Negi et al. conclude that the best sets of tones to be used are those with equal spacing. Based on a first order Markov channel model, they propose that it is more efficient to use a few pilot tones in all symbols than to use all tones as pilot tones in some symbols.

Another article, *Channel Estimation Techniques Based on Pilot Arrangement in OFDM Systems*, by Coleri et al., IEEE Trans. on Broadcasting, vol. 48, No. 3, pp. 223-229, September 2002, investigates channel estimation techniques for OFDM systems based on pilot arrangement. Channel estimation based on a comb-type pilot arrangement is studied through different algorithms for both estimating a channel at pilot frequencies and interpolating the channel. In addition, channel estimation based on block-type pilot arrangement is performed by sending pilots at every sub-channel and using this estimation for a specific number of following symbols. A decision feedback equalizer for all sub-channels combined with periodic block-type pilot channel estimation is also implemented.

*OFDM channel estimation by singular value decomposition, IEEE Trans. on Communications*, by Edfors et al., vol. 46, pp. 931-939, July 1998, *Analysis of DFT-based channel estimation for OFDM, Wireless Personal Communications*, by Edfors et al., vol. 12, No. 1, pp. 55-70, January 2000, and *Analysis of low-complexity windowed DFT-based MMSE channel estimator for OFDM systems*, by Yang et al. IEEE Trans. on Communications, vol. 49, pp. 1977-1987, November 2001, describe Least Square, LS, Minimum Mean Square Error, MMSE, or Discrete Fourier Transform, DFT, based estimators.

TELECOMMUNICATIONS INDUSTRY ASSOCIATION TIA-864, *Recommended Minimum Performance Standards for cdma2000® High Rate Packet Data Access Network Equipment*, February 2002 describes a forward pilot channel, an unmodulated, direct-sequence spread spectrum signal transmitted every half slot in bursts of 96 chips centered at the middle of the half slot. The Pilot Channel allows an access terminal to acquire the timing of the Forward Channel, provides a phase reference for coherent demodulation, and provides means for signal strength comparisons between sectors for determining when to handoff. It also describes a forward MAC channel, a forward channel used for medium access control. The Forward MAC Channel consists of Reverse Power Control Channels, DRCLock Channel and Reverse Activity Channel. Within each slot, the Pilot, MAC, and Traffic or Control Channels shall be time-division multiplexed. All time-division multiplexed channels shall be transmitted at equal power. A Forward Traffic Channel, a forward channel used to transport user and signaling traffic from an access network to an access terminal, is also described.

1×EV-DO Platinum Multicast is suggested as a backwards-compatible evolution of 1×EV-DO. The existing EV-DO forward link design uses CDMA to transmit data packets to a single user (uni-cast), or simultaneously to multiple users (multicast), during different time slots (called time division multiplexing, or TDM). Each packet is provided the full forward link power from one cell sector during its time slot. EV-DO Platinum Multicast further improves performance by reserving the same TDM time slot at all cells in a region and then transmitting one or more common packets within the reserved slot to all users in the region. Mobile devices receive the same packet from multiple cells and then softly combining the energy to improve reception. To simplify the soft combination of the common packets transmitted simultaneously from all cell sectors in multi-cast mode, an orthogonal frequency division multiplex (OFDM) waveform is used for transmission during the common TDM time slot.

*Parameter Estimation: Principles and Problems*, by H. W. Sorenson, New York, N.Y., Marcel Dekker, 1980, derives an MMSE estimator for a channel matrix H based on observation vector $X_p$ of pilot sub-carriers.

SUMMARY

The inventor recognized that there is often more than one source of "side" or predetermined information transmitted by the transmitter and received by the receiver, albeit in distorted form, that can be used in estimating the channel transfer function (hereafter "the channel"). Side or predetermined information includes any information that is known in advance of the channel estimation by both the transmitter and the receiver or that can be readily determined by the transmitter and the receiver in advance of channel estimation.

The approaches in the above-identified documents do not describe channel estimation based on multiple sources of predetermined information. For example, in the context of a CDMA system in which OFDM is used, the inventor realized that channel estimation could be based both on sub-carrier pilot tone frequencies and CDMA pilot sequences. By using more than one source of predetermined information, the accuracy and the reliability of the resulting channel estimate can be significantly improved.

In general terms (with detailed non-limiting examples provided below), a communications channel can be estimated using multiple sources of side information. A signal transmitted over a radio channel includes a first predetermined signal and a second predetermined signal. The first predetermined signal is different from the second predetermined signal. An estimate of the radio channel is determined using both the first predetermined signal and the second predetermined signal. That determination may include minimizing a mean square error between an actual radio channel representation and the estimate of the radio channel.

In a first, non-limiting, example embodiment, the estimate of the radio channel is determined based on both the first predetermined signal and the second predetermined signal and directly uses both in the estimation calculation. In a second, non-limiting, example embodiment, the estimate of the radio channel only uses the first predetermined information indirectly in that estimation calculation.

More specifically in the second, non-limiting, example embodiment, a first channel estimate is calculated using the first predetermined signal. A first accuracy of the first channel estimate is determined. A second channel estimate is calculated using the first channel estimate and the first accuracy of the first channel estimate. The first channel estimate and the first accuracy of the first channel estimate are used as first and second order statistics of the radio channel, respectively. As understood by those skilled in the art of statistics, first order statistics correspond to the arithmetic mean of the data set, and second order statistics correspond to the variance of the data set with respect to the arithmetic mean. A mean square error of the second channel estimate is minimized based on the second predetermined signal to determine the estimate of the radio channel. In this embodiment, the first predetermined signal is not directly used in the minimizing step.

The second non-limiting example embodiment can be extended. For example, assume that the signal transmitted over a radio channel includes a third predetermined signal. A second accuracy of the second channel estimate is determined. A third channel estimate is calculated using the second channel estimate and the second accuracy of the second channel estimate. The second channel estimate and the second accuracy of the second channel estimate are used as first and second order statistics of the radio channel, respectively. A mean square error of the third channel estimate is then minimized based on the third predetermined signal to determine the estimate of the radio channel. The first and second predetermined signals are not directly used in the minimizing step.

One non-limiting application of this technology is to a DS-CDMA radio communications system that uses OFDM. The first predetermined signal includes direct sequence pilot chips and the second predetermined signal includes OFDM pilot symbols on OFDM sub-carriers. Radio channel specific parameters are initialized. The estimate of the radio channel is then determined according to an objective function that minimizes residual error between an actual representation of the radio channel and the estimate of the radio channel determined based on both the OFDM pilot symbols on OFDM sub-carriers and the direct sequence pilot chips.

A first channel estimate may be determined based on the direct sequence pilot chips. A first accuracy of the first channel estimate may be determined. A second channel estimate is determined based on the OFDM pilot symbols on the OFDM sub-carriers, the first channel estimate, and the first accuracy. The first channel estimate is calculated to correspond with a channel estimate having a maximum likelihood of being the actual radio channel. The first channel estimate and the determined accuracy of the first channel estimate are used as first and second order statistics of the radio channel, respectively. A mean square error of the second channel estimate is minimized based on the OFDM sub-carriers to determine the estimate of the radio channel.

One non-limiting commercial application for this technology is to estimating a downlink channel and/or an uplink channel in a mobile radio communications system.

DETAILED DESCRIPTION

Figure 1:
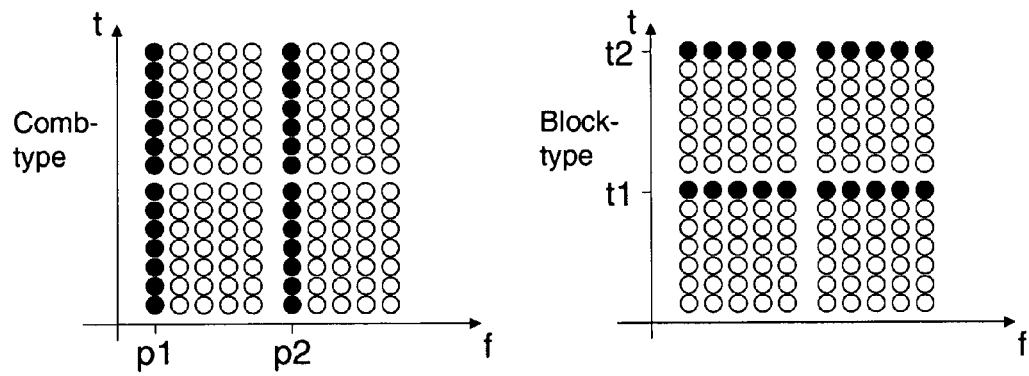
FIG. 1 illustrates various pilot arrangements.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

In general terms (with detailed non-limiting examples provided below), a communications channel can be estimated using multiple sources of side information. A signal transmitted over a radio channel includes a first predetermined signal and a second predetermined signal. The first predetermined signal is different from the second predetermined signal. An estimate of the radio channel is determined using both the first predetermined signal and the second predetermined signal. That determination may include minimizing a mean square error between an actual radio channel representation and the estimate of the radio channel. To facilitate understanding and explanation, the following description is made in the context of a direct sequence-CDMA radio communications system that employs OFDM. However, the technology is not limited to direct sequence-CDMA or to OFDM.

Figure 2:
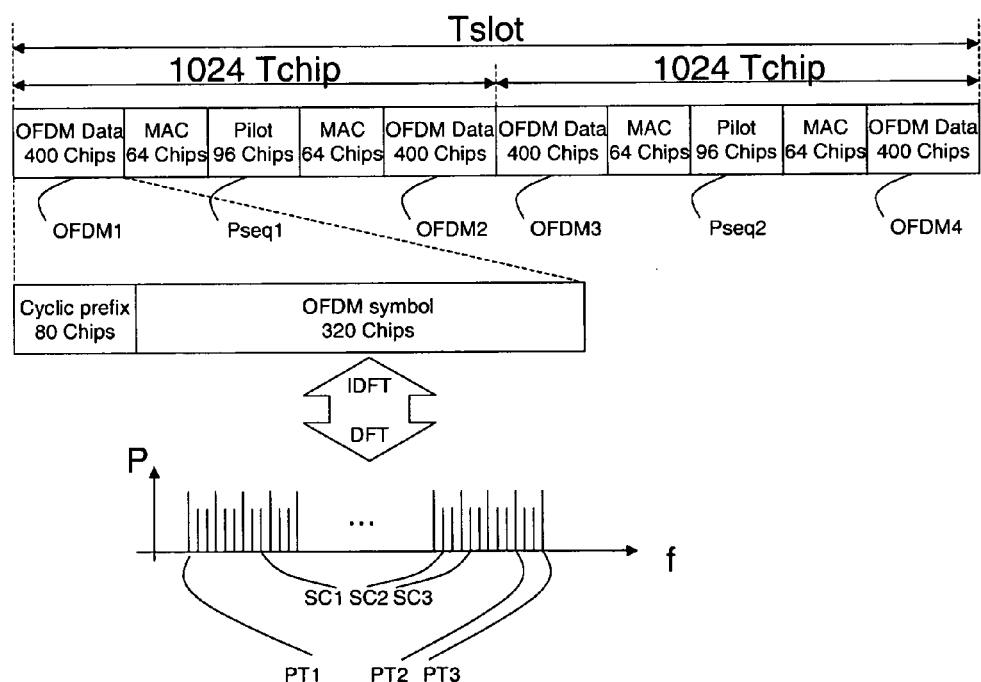
FIG. 2 shows a slot format with four OFDM symbols retrofit into a 1×EV-DO time slot for backward compatibility.

FIG. 2 illustrates an example slot-format for Enhanced Broadcast-Multicast in high rate packet data (HRPD). Four OFDM symbols <<OFDM symbol>>, <<OFDM1>>, <<OFDM2>>, <<OFDM3>>, <<OFDM4>> are retrofit into a 1×EV-DO time slot according to CDMA2000. The example slot-format illustrates recurrent pilot sequences <<Pseq1>>, <<Pseq2>>. Each OFDM symbol is transformed <<IDFT, DFT>> prior to transmission on a radio channel. Each OFDM symbol is transmitted on 320 sub-carriers, out of which 64 are used for pilot symbols, i.e. every fifth of the 320 sub-carriers. OFDM data <<OFDM Data>> also comprises a cyclic prefix <<Cyclic prefix>>.

The example slot-format in FIG. 2 illustrates a situation when more than one known signal is provided at transmitter side, providing a means to retrieve channel information, which information is preferably used for channel estimation. Specifically, one predetermined signal corresponds to the OFDM subcarrier pilot tones PT1, PT2, PT3, etc. Another predetermined signal corresponds to the two fields of 96 pilot chips included the time slot Tslot.

Figure 3:
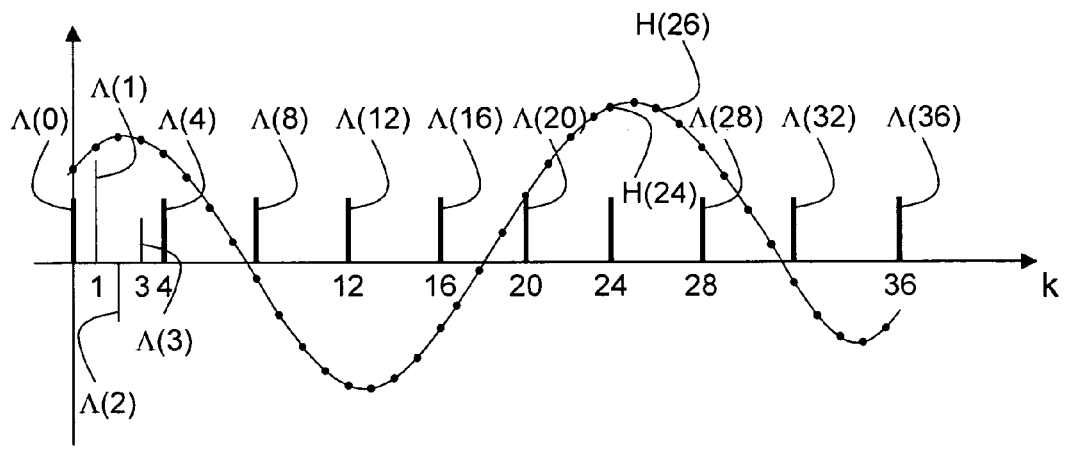
FIG. 3 shows a typical channel frequency response sampled at regular intervals.

FIG. 3 shows a typical channel frequency response H(k) <<H(24)>>, <<H(26)>> along the vertical axis, sampled at regular intervals <<k>> along the horizontal axis. In FIG. 3, data and pilot symbols Λ(k) <<Λ(0)>>, <<Λ(1)>> ... <<Λ(36)>> are also included. The data and pilot symbols <<Λ(0)>>, <<Λ(1)>> ... <<Λ(36)>> are modulated on sub-carriers (320 sub-carriers in FIG. 2). Every M:th sub-carrier is a pilot tone. With K sub-carriers, there are $L_p$ pilot tones. In FIG. 3 every fourth sub-carrier is a pilot tone <<Λ(0)>>, <<Λ(4)>> ... <<Λ(36)>>. As an example, with K=32 and M=4, then $L_p$=8.

The sub-carriers are subject to channel fading represented by the channel frequency response H(k). With K sub-carriers, the corresponding discrete time signal is a length-K Inverse Discrete Fourier Transform (IDFT) of Λ(k) prefixed by a cyclic extension from the end of the signal block. If the length, K, exceeds the channel delay spread, the cyclic prefix allows the receiver to extract a section of the channel-filtered received signal in which the discrete frequency domain receive samples can be expressed as $$X(k)=\Lambda(k)H(k)+Z(k), k=0,\ldots,K-1, \quad (1)$$

where Z(k) is Additive White Gaussian Noise, AWGN, with variance $\sigma_z^2$. The time domain equivalence of equation (1) is $$x(n) = \mathcal{F}_K^{-1}\{X(k)\} \quad (2)$$
$$= \lambda(n) \otimes h(n) + z(n), \quad n = 0, 1 \ldots K-1, \quad (3)$$

where $\mathcal{F}_K^{-1}$ denotes Inverse Discrete Fourier Transform, IDFT, of length K and $\otimes$ denotes circular convolution between two sequences of equal lengths.

The MMSE channel estimator of a pilot-aided system relies on the knowledge of a priori information on the channel in terms of second order statistics. For an OFDM system for operations in a frequency selective environment, channel frequency correlation can be related to the channel time domain multipath equivalents $$h(n)=\bar{h}(n)+\tilde{h}(n), \quad (4)$$

where $\bar{h}(n)$ denotes channel mean impulse response and $\tilde{h}(n)$ denotes remaining zero-mean random channel impulse response of variance γ(n). Even if the channel impulse response is defined over the range 0≦n<K its support should be less than the length of the cyclic prefix in order for the circular system model in equations (1) and (2) to be valid. The channel frequency correlation function then is $$\Gamma(k_1, k_2) \triangleq E\{H(k_1)H^*(k_2)\} \quad (5)$$
$$= \sum_{n=0}^{K-1} \gamma(n) e^{-j2\pi n(k_1-k_2)/K}, \quad (6)$$

which is channel spectral density at normalized frequency $(k_1-k_2)/K$.

In vector representation equation (1) reads $$X=\Lambda H+Z, \quad (7)$$

where Λ is a K-dimensional diagonal matrix and X, H and Z are column vectors with K elements each. The subset of the received samples corresponding to the pilot symbols are similarly defined as $$X_p=\Lambda_p H_p+Z_p, \quad (8)$$

where $\Lambda_p$ is an $L_p$-dimensional diagonal matrix, with diagonal elements $\Lambda_0, \Lambda_1, \ldots, \Lambda_{L_p}$, and $X_p$, $H_p$ and $Z_p$ are column vectors with $L_p$ elements each. The components of $X_p$ in equation (8) are consequently $$X_{p_k} = \Lambda_{p_k} H_{p_k} + Z_{p_k}, \; p_k = 0, 1 \ldots L_p - 1 \tag{9}$$

For the case of all random processes being Gaussian and independent with AWGN, the MMSE estimate of the channel represented by H is preferably determined according to the relation $$\hat{H} = E\{H \mid X_p\} \tag{10}$$

$$= \overline{H} + \Gamma_c \Lambda_p^H (\Lambda_p \Gamma_p \Lambda_p^H + \sigma_Z^2 I)^{-1} \Lambda_p (\Lambda_p^{-1} X_p - \overline{H}_p), \tag{11}$$

where superscript H denotes Hermitian transpose (transposed and complex conjugated matrix) and $$\overline{H} \triangleq E\{H\}, \tag{12}$$

$$\overline{H}_p \triangleq E\{H_p\}, \tag{13}$$

$$\Gamma_c \triangleq E\{(H - \overline{H})(H_p - \overline{H}_p)^H\}, \tag{14}$$

$$\Gamma_p \triangleq E\{(H_p - \overline{H}_p)(H_p - \overline{H}_p)^H\}, \tag{15}$$

where $E\{\bullet\}$ denotes expected value. The elements of the covariance matrices $\Gamma_c$ and $\Gamma_p$ are preferably determined from the channel power delay profile according to $$(\Gamma_c)_{i,j} = E\{(H(i) - \overline{H}(i))(H^*(p_j) - \overline{H}^*(p_j))\}, \tag{16}$$

$$= \Gamma(i, p_j) \tag{17}$$

$$(\Gamma_p)_{i,j} = E\{(H(p_i) - \overline{H}(p_i))(H^*(p_j) - \overline{H}^*(p_j))\}, \tag{18}$$

$$= \Gamma(p_i, p_j) \tag{19}$$

When there is no prior knowledge of the channel characteristics, good performance is achieved in many cases by assumption of a frequency selective channel with zero mean, $\overline{h}(n) = 0$ and the channel being slowly varying in the sense of its power delay profile $\gamma(n)$ being substantially more extended than transmission symbol time.

Figure 4:
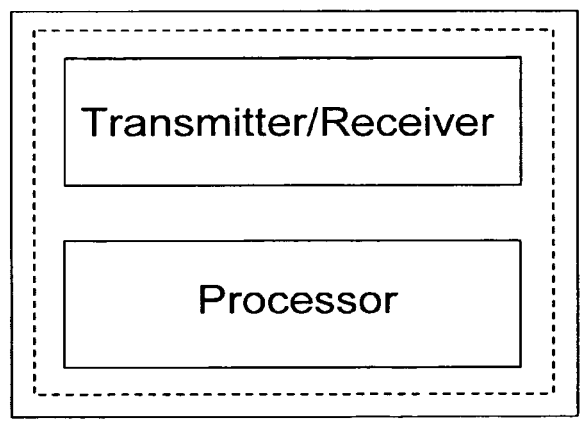
FIG. 4 illustrates schematically a radio communications apparatus.

FIG. 4 illustrates schematically a radio communications apparatus. The radio communications apparatus comprises a transmitter/receiver for transmitting and/or receiving a signal comprising one or more pilot time-sequences and pilot sub-carriers carrying pilot symbols. A signal processor processes the received signal for channel estimation incorporating information comprised in one or more pilot time-sequences and pilot symbols carried on the subcarriers. The radio communications apparatus is adapted to operate according to at least one of the embodiments described below. The radio communications apparatus is, e.g., user equipment in a mobile communications system, or included in such user equipment.

According to a first non-limiting example embodiment, side information is included for an optimum MMSE channel estimate in the sense of mean square error being jointly minimized over both sub-carrier observation, see equation (8) above, and pilot sequence observation, see equation (24) below. A predefined pilot sequence, denoted $s_p(n)$, is defined for a segment of length $L_s$ $$s_p(n) = \begin{cases} s(n) & n_0 \le n \le n_0 + L_s, \\ 0 & \text{otherwise.} \end{cases} \tag{20}$$

In FIG. 2, s(n) corresponds to the entire block <<Tslot>> and $s_p(n)$ any of the two 96-chip pilot sequences <<Pilot>>. On receiver side, the received signal is $$r(n) = h(n) * s(n) + z(n) \tag{21}$$

$$= \sum_{k=0}^{K-1} h(k) s(n-k) + z(n), \tag{22}$$

where * denotes convolution and z(n) is AWGN with variance $\sigma_z^2 = \sigma_{z'}^2/K$.

The segment of the received signal corresponding to the pilot sequence can be expressed in matrix form as $$\begin{pmatrix} r(n_0) \\ r(n_0+1) \\ r(n_0+2) \\ \vdots \end{pmatrix} = \begin{pmatrix} s(n_0) & s(n_0-1) & s(n_0-2) & \ldots; s(n_0+1) \\ s(n_0) & s(n_0-1) & \ldots & s(n_0+2) \\ s(n_0+1) & s(n_0) & \ldots & \vdots \\ \vdots & \vdots & \vdots & \ddots \end{pmatrix} \tag{23}$$

$$\begin{pmatrix} h(0) \\ h(1) \\ h(2) \\ \vdots \end{pmatrix} + \begin{pmatrix} z(n_0) \\ z(n_0+1) \\ z(n_0+2) \\ \vdots \end{pmatrix}$$

or more concisely, $$r_p = s_p h + z_p. \tag{24}$$

The optimal MMSE channel estimator based on both the pilot sub-carriers observation of equation (8) and the pilot sequence observation of equation (24) is given by $$\hat{H} = E\{H \mid X_p, r_p\} \tag{25}$$

$$= \overline{H} + (\Gamma_c \Lambda_p^H \quad \Gamma_{Hh} s_p^H) \begin{pmatrix} \Lambda_p \Gamma_p \Lambda_p^H + \sigma_Z^2 I & \Lambda_p \Gamma_{Hph} s_p^H \\ s_p \Gamma_{HHp} \Lambda_p^H & s_p \Gamma_h s_p^H + \sigma_Z^2 I \end{pmatrix}^{-1} \tag{26}$$

$$\begin{pmatrix} X_p - \Lambda_p \overline{H}_p \\ r_p - s_p \overline{h} \end{pmatrix},$$

where $\Gamma_{Hh}$, $\Gamma_{Hph}$ and $\Gamma_h$ are matrices with components $$(\Gamma_{Hh})_{k,l} = E\{(H(k) - \overline{H}(k))(h^*(l) - \overline{h}^*(l))\}, \tag{27}$$

$$= \gamma(n) e^{-j2\pi k l/K},$$

$$(\Gamma_{Hph})_{k,l} = E\{(H(p_k) - \overline{H}(p_k))(h^*(l) - \overline{h}^*(l))\} \tag{28}$$

$$= \gamma(n) e^{-j2\pi p_k l/K}, \text{ and} \tag{29}$$

$$(\Gamma_h)_{k,l} = E\{(h(k) - \overline{h}(k))(h^*(l) - \overline{h}^*(l))\}, \tag{30}$$

respectively.

Figure 5:
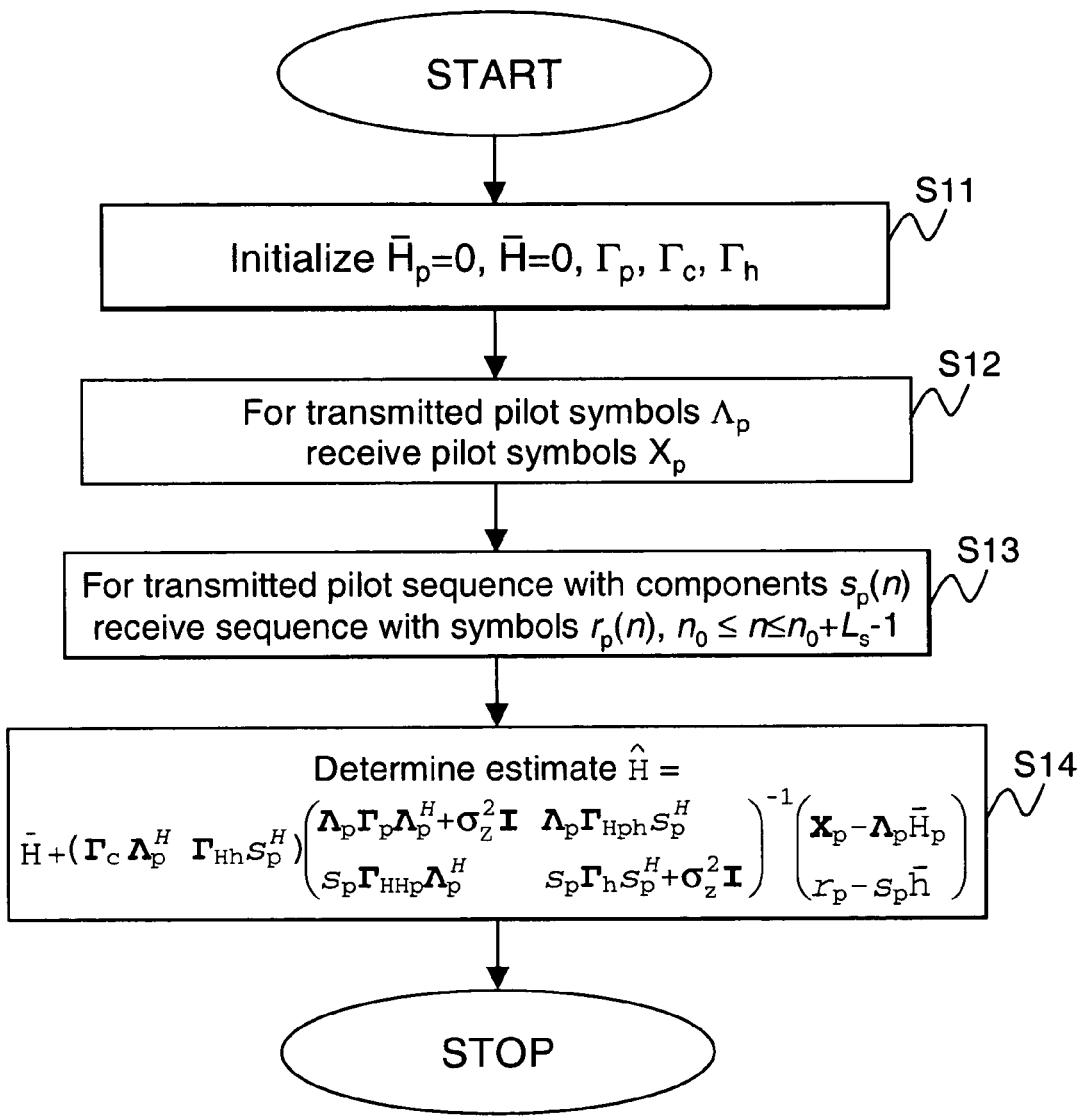
FIG. 5 demonstrates an example flowchart illustrating a first non-limiting example embodiment.

FIG. 5 shows an example flow chart illustrating the method according to the first example embodiment. In FIG. 5, the ordering of steps is not mandatory, and the separation into distinct steps is to facilitate explanation. Channel parameters are initialized <<S11>> for zero mean channel impulse response. Correlation parameters are also initialized. For pilot symbols $\Lambda_p$ transmitted on sub-carriers, pilot symbols $X_p$ are received <<S12>>. Sent components $s_p(n)$ of a pilot sequence is received <<S13>> as $r_p(n)$, $n_0 \leq n \leq n_0+L_s$. A channel estimate is determined <<S14>> from sent one or more pilot sequences and pilot symbols sent on sub-carriers. The determination <<S14>> jointly includes information from received pilot symbols sent on OFDM sub-carriers and one or more received CDMA pilot sequences.

According to a second, non-limiting, example embodiment, predetermined side information is included for a sub-optimum MMSE channel estimate, the MMSE channel estimate being based on OFDM pilot sub-carriers in equations (10) and (11) and combined with a correlator-based direct-sequence spreading channel-estimate.

In a direct-sequence spreading CDMA system, for which a slot format such as the example slot format in FIG. 2 was originally designed, the one or more CDMA pilot sequences can be used for channel estimation based on a correlator output, the correlator being matched to the one or more pilot sequences. (For the example in FIG. 2, there are two pilot sequences.) With pilot sequence $s_p(n)$, the correlator output $\alpha(\tau)$ reads $$\alpha(\tau) = \sum_{n=0}^{L_s-1} r(n+\tau) s_p^*(n) \tag{31}$$

$$= h(\tau) R_s(0) + \sum_{k=0, k \neq \tau}^{K-1} h(k) R(\tau-k) + \sum_{n=0}^{L_s-1} r(n+\tau) s_p^*(n), \tag{32}$$

where $$R_s(\tau) = \sum_{n=0}^{L_s-1} s(n+\tau) s_p^*(n), \tag{33}$$

and $R_s(0) = \rho_s^2 L_s$. The second and third terms in equation (32) are negligible compared to the first term if the length of the pilot sequence, $L_s$, is great. Under conditions for this approximation to hold, the channel impulse response can be approximated by $$h(\tau) = \frac{\alpha(\tau)}{R_s(0)} \approx \bar{h}(\tau) + \tilde{h}(\tau), \tag{34}$$

where $$\tilde{h}(\tau) = \frac{1}{R_s(0)} \left[ \sum_{k=0, k \neq \tau}^{K-1} h(k) R_s(\tau-k) + \sum_{n=0}^{L_s-1} z(n+\tau) s_p^*(n) \right] \tag{35}$$

is the channel estimation error. The right-hand side of the approximation in equation (34) defines a direct-sequence spreading channel estimate in the second embodiment $$\hat{h}(\tau) \triangleq \bar{h}(\tau) + \tilde{h}(\tau). \tag{36}$$

An estimate of the accuracy of the direct-sequence spreading channel estimate is $$E\{|\tilde{h}(\tau)|^2\} = \frac{1}{L_s} \sum_{k=0, k \neq \tau}^{K-1} |h(k)|^2 + \frac{\sigma_z^2}{\rho_s^2 L_s} \tag{37}$$

$$\approx \hat{\gamma}(\tau), \tag{38}$$

where $\rho_s^2 = R_s(0)/L_s$ is the variance of the signal $s(n)$ and $$\hat{\gamma}(\tau) \triangleq \frac{1}{L_s} \sum_{k=0, k \neq \tau}^{K-1} \left| \frac{\alpha(k)}{\rho_s^2 L_s} \right|^2 + \frac{\sigma_z^2}{\rho_s^2 L_s} \tag{39}$$

$$= \frac{1}{L_s} \sum_{k=0, k \neq \tau}^{K-1} |\hat{h}(k)|^2 + \frac{\sigma_z^2}{\rho_s^2 L_s}. \tag{40}$$

A channel estimate is achieved according to the second non-limiting example embodiment with the estimator operating with parameters of equations (12)-(15) determined to $$[\overline{H}]_k = \sum_{n=0}^{K-1} \hat{h}(n) e^{-j2\pi nk/K}, 0 \leq k < K \tag{41}$$

$$[\overline{H}_P]_i = [\overline{H}]_{p_i}, 0 \leq i < L_p \tag{42}$$

$$[\Gamma_c]_{ij} = \hat{\Gamma}(i - p_j), \tag{43}$$

$$[\Gamma_P]_{ij} = \hat{\Gamma}(p_i - p_j), \tag{44}$$

where $\hat{\Gamma}(k) = \mathcal{F}_K\{\hat{\gamma}(n)\}$.

Figure 6:
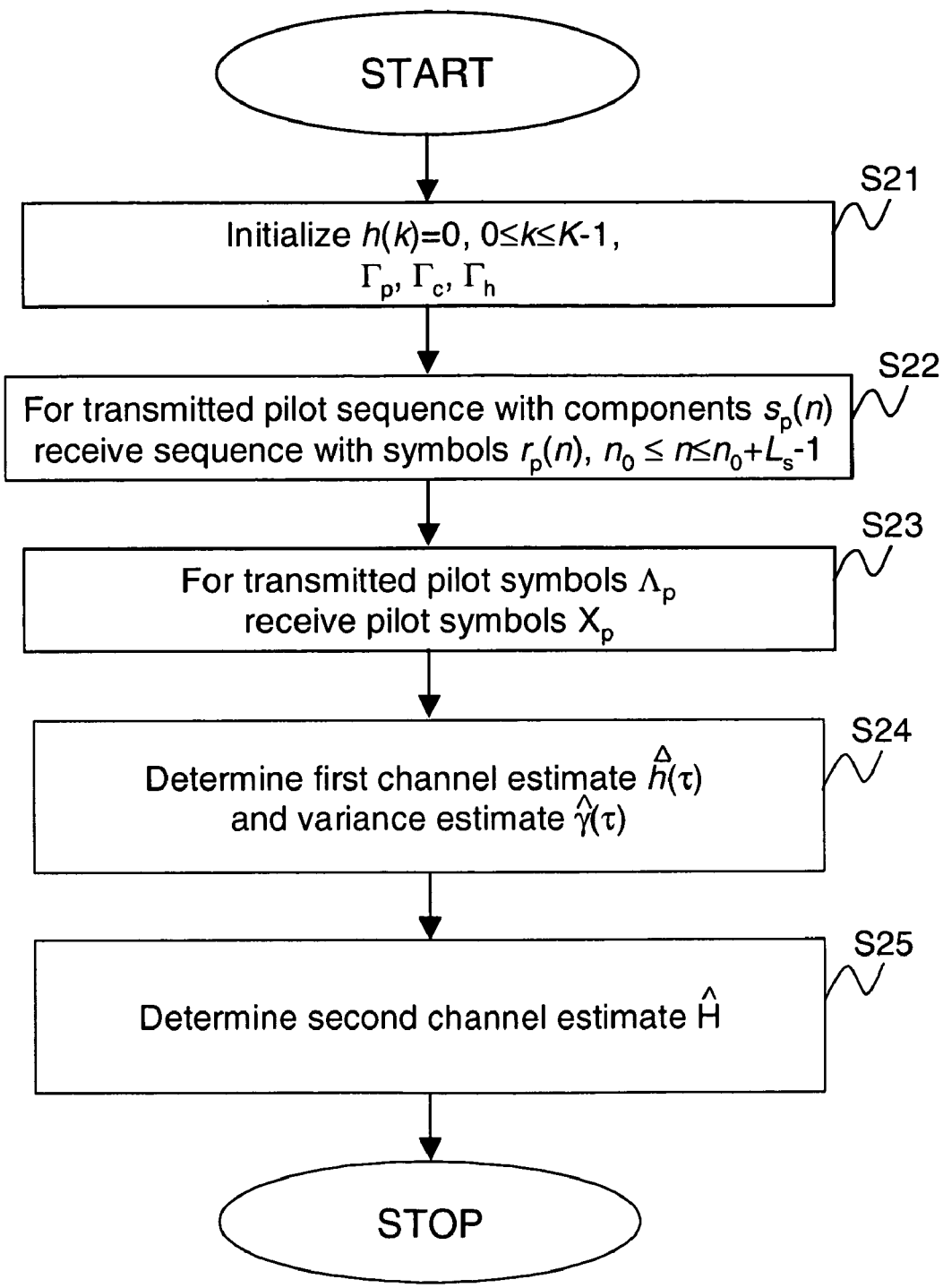
FIG. 6 shows an example flow chart illustrating a second non-limiting example embodiment.

FIG. 6 shows an example flow chart illustrating the method according to the second example embodiment. Again, the ordering is not mandatory, and the separation into distinct steps is mainly to facilitate explanation. Channel parameters are initialized <<S21>> for zero mean channel impulse response. Also channel correlation parameters are initialized. Sent pilot sequence $s_p(n)$ is received as $r_p(n)$, $n_0 \leq n \leq n_0+L_s-1$, <<S22>> and on pilot sub-carriers sent pilot symbols $\Lambda(p_k)$ are received as $X(p_k)$, $0 \leq p_k \leq L_p-1$, <<S23>> as described above. According to the second embodiment, a first channel estimate is determined <<S24>> using first piece of information. In the example OFDM/CDMA system, from the sent one or more pilot sequences the first channel estimate is determined <<S24>> according to equations (31-34; 36; 39-40) not including information from pilot symbols being sent on sub-carriers. This first channel estimate <<S24>> is input when second channel estimate is determined <<S25>> from additional piece of information and the first channel estimate. In the example OFDM/CDMA system, the determination <<S25>> of the second channel estimate includes information from pilot symbols being sent on sub-carriers according to equation (11).

The second embodiment approach may be extended. For example, assume that the signal transmitted over a radio channel includes a third predetermined signal. A second accuracy of the second channel estimate is determined. A third channel estimate is calculated using the second channel estimate and the second accuracy of the second channel estimate. The second channel estimate and the second accuracy of the second channel estimate are used as first and second order statistics of the radio channel, respectively. A mean square error of the third channel estimate is then minimized based on the third predetermined signal to determine the estimate of the radio channel. The first and second predetermined signals are not directly used in the minimizing step. If four different predetermined signals are available, then the same approach could be used and so forth.

For an example system using signal format as illustrated in FIG. 2 with K=320, $L_s$=96, M=4, 5, 8, 10, 16 or 20 and signal-to-noise ratio, SNR, in range from −4 dB to 4 dB, and for a channel with exponential decay of the time-delay spread and 4 taps substantially greater than zero, compared to MMSE based on the pilot sub-carriers only, the second embodiment improves performance in terms of residual estimation error, depending on channel properties and signal parameters, for M=5 in the range of 2.5 dB and the first embodiment improves performance approximately another 1-2 dB. The gain increases with increasing M corresponding to increasing number of pilot tones. Consequently, the above-described technology improves performance substantially.

In this patent application, acronyms such as MMSE, HRPD, OFDM, DS, CDMA and 1×EV-DO have been used as examples only and are not intended to be limiting in any way. These principles of operation may be applied to any suitable communications apparatus and/or communications apparatus.

The invention is not intended to be limited only to the embodiments described in detail above. Changes and modifications may be made without departing from the invention. It covers all modifications within the scope of the following claims.

The invention claimed is:

1. A method of channel estimation as applied to a DS-CDMA radio communications system that uses OFDM, comprising:
   a radio receiver initializing radio channel specific parameters and receiving a signal transmitted over a radio channel including a first predetermined signal of a first type that includes direct sequence pilot chips and a second predetermined signal of a second type that includes OFDM pilot symbols on OFDM sub-carriers, the first type of predetermined signal being different from the second type of predetermined signal, and
   a processor determining an estimate of the radio channel according to an objective function that minimizes residual error between an actual representation of the radio channel and the estimate of the radio channel determined based on both the OFDM pilot symbols on OFDM sub-carriers and the direct sequence pilot chips.

2. The method in claim 1, wherein the determining of the estimate of the radio channel includes minimizing a mean square error between an actual radio channel representation and the estimate of the radio channel.

3. The method in claim 1, further comprising:
   determining a first channel estimate based on the direct sequence pilot chips;
   determining a first accuracy of the first channel estimate; and
   determining a second channel estimate based on the OFDM pilot symbols on the OFDM sub-carriers, the first channel estimate, and the first accuracy.

4. The method in claim 3, wherein the first channel estimate is calculated to correspond with a channel estimate having a maximum likelihood of being the actual radio channel.

5. The method in claim 3, further comprising
   using the first channel estimate and the determined accuracy of the first channel estimate as first and second order statistics of the radio channel, respectively; and
   minimizing a mean square error of the second channel estimate based on the OFDM sub-carriers to determine the estimate of the radio channel.

6. The method in claim 1 used to estimate a downlink channel in a mobile radio communications system.

7. A method of channel estimation, comprising:
   a radio receiver receiving a signal transmitted over a radio channel including a first predetermined signal of a first type and a second predetermined signal of a second type, the first type of predetermined signal being different from the second type of predetermined signal, and
   a processor determining an estimate of the radio channel using both the first predetermined signal of the first type and the second predetermined signal of the second type,
   wherein determining the estimate of the radio channel includes:
   calculating a first channel estimate using the first predetermined signal;
   determining a first accuracy of the first channel estimate; and
   calculating a second channel estimate using the first channel estimate, the first accuracy of the first channel estimate and the second predetermined signal.

8. The method in claim 7, further comprising:
   using the first channel estimate and the first accuracy of the first channel estimate as first and second order statistics of the radio channel, respectively; and
   minimizing a mean square error of the second channel estimate based on the second predetermined signal to determine the estimate of the radio channel,
   wherein the first predetermined signal is not directly used in the minimizing step.

9. The method in claim 8, wherein the signal transmitted over a radio channel includes a third predetermined signal, the method further comprising:
   determining a second accuracy of the second channel estimate; and
   calculating a third channel estimate using the second channel estimate, the second accuracy of the second channel estimate and the third predetermined signal.

10. The method in claim 9, further comprising:
    using the second channel estimate and the second accuracy of the second channel estimate as first and second order statistics of the radio channel, respectively; and
    minimizing a mean square error of the third channel estimate based on the third predetermined signal to determine the estimate of the radio channel,
    wherein the first and second predetermined signals are not directly used in the minimizing step.

11. Apparatus for channel estimation as applied to a DS-CDMA radio receiving node configured to use OFDM, comprising:
    a receiver for receiving a signal transmitted over a radio channel including a first predetermined signal that includes direct sequence pilot chips and a second predetermined signal that includes OFDM pilot symbols on OFDM sub-carriers, the first predetermined signal being different from the second predetermined signal, and
    a processor for determining an estimate of the radio channel according to an objective function that minimizes residual error between an actual representation of the radio channel and the estimate of the radio channel determined based on both the OFDM pilot symbols on OFDM sub-carriers and the direct sequence pilot chips.

12. The apparatus in claim 11, wherein the processor is configured to minimize a mean square error between an actual radio channel representation and the estimate of the radio channel in determining the estimate of the radio channel.

13. The apparatus in claim 11, wherein the processor is configured to:
  determine a first channel estimate based on the direct sequence pilot chips;
  determine a first accuracy of the first channel estimate; and
  determine a second channel estimate based on the OFDM pilot symbols on the OFDM sub-carriers, the first channel estimate, and the first accuracy.

14. The apparatus in claim 13, wherein the processor is configured to calculate the first channel estimate to correspond with a channel estimate having a maximum likelihood of being the actual radio channel.

15. The apparatus in claim 13, wherein the processor is configured to:
  use the first channel estimate and the determined accuracy of the first channel estimate as first and second order statistics of the radio channel, respectively; and
  minimize a mean square error of the second channel estimate based on the OFDM sub-carriers to determine the estimate of the radio channel.

16. Apparatus for channel estimation, comprising:
  a receiver for receiving a signal transmitted over a radio channel including a first predetermined signal and a second predetermined signal the first predetermined signal being different from the second predetermined signal, and
  a processor for determining an estimate of the radio channel using both the first predetermined signal and the second predetermined signal,
  wherein the processor is configured to;
  calculate a first channel estimate using the first predetermined signal;
  determine a first accuracy of the first channel estimate;
  calculate a second channel estimate using the first channel estimate, the first accuracy of the first channel estimate and the second predetermined signal.

17. The apparatus in claim 16, wherein the processor is configured to:
  use the first channel estimate and the first accuracy of the first channel estimate as first and second order statistics of the radio channel, respectively; and
  minimize a mean square error of the second channel estimate based on the second predetermined signal to determine the estimate of the radio channel,
  wherein the processor is configured to not directly use the first predetermined signal in the minimization.

18. The apparatus in claim 16, wherein the signal transmitted over a radio channel includes a third predetermined signal, and wherein the processor is configured to:
  determine a second accuracy of the second channel estimate;
  calculate a third channel estimate using the second channel estimate, the second accuracy of the second channel estimate and the third predetermined signal.

19. The apparatus in claim 18, wherein the processor is configured to:
  use the second channel estimate and the second accuracy of the second channel estimate as first and second order statistics of the radio channel, respectively; and
  minimize a mean square error of the third channel estimate based on the third predetermined signal to determine the estimate of the radio channel,
  wherein the processor is configured to not directly use the first and second predetermined signals in the minimization.

20. A radio communications system, comprising:
  a transmitter for transmitting a signal over a radio channel including a first predetermined signal and a second predetermined signal, the first predetermined signal being different from the second predetermined signal, and
  a receiver for receiving the signal transmitted over a radio channel, the receiver including:
  a processor for determining an estimate of the radio channel using both the first predetermined signal and the second predetermined signal, the processor being configured to:
  calculate a first channel estimate using the first predetermined signal;
  determine a first accuracy of the first channel estimate; and
  calculate a second channel estimate using the first channel estimate, the first accuracy of the first channel estimate and the second predetermined signal.

21. The radio communications system in claim 20, wherein the processor is configured to minimize a mean square error between an actual radio channel representation and the estimate of the radio channel in determining the estimate of the radio channel.

22. The radio communications system in claim 20, wherein the processor is configured to:
  use the first channel estimate and the first accuracy of the first channel estimate as first and second order statistics of the radio channel, respectively; and
  minimize a mean square error of the second channel estimate based on the second predetermined signal to determine the estimate of the radio channel, wherein the processor is configured to not directly use the first predetermined signal in the minimization.

23. The radio communications system in claim 20, wherein the transmitter and receiver are configured as to use DS-CDMA and OFDM, wherein the first predetermined signal includes direct sequence pilot chips and the second predetermined signal includes OFDM pilot symbols on OFDM sub-carriers.

* * * * *